(12) United States Patent
Yu et al.

(10) Patent No.: US 9,706,039 B2
(45) Date of Patent: *Jul. 11, 2017

(54) METHOD FOR PERFORMING COOPERATIVE FUNCTION AUTOMATICALLY AND DEVICE USING THE SAME

(71) Applicant: Samsung Electronics Co., Ltd., Suwon-si, Gyeonggi-do (KR)

(72) Inventors: Seung-dong Yu, Osan-si (KR); Woo-yong Chang, Yongin-si (KR); Se-jun Park, Yongin-si (KR); Min-jeong Moon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,338

(22) Filed: Apr. 15, 2016

(65) Prior Publication Data

US 2016/0234372 A1    Aug. 11, 2016

Related U.S. Application Data

(63) Continuation of application No. 14/638,757, filed on Mar. 4, 2015, now Pat. No. 9,326,095, which is a
(Continued)

(30) Foreign Application Priority Data

Aug. 24, 2009   (KR) ........................ 10-2009-0078349

(51) Int. Cl.
*H04M 1/725*   (2006.01)
*G06F 13/38*   (2006.01)
(Continued)

(52) U.S. Cl.
CPC ...... *H04M 1/72533* (2013.01); *G06F 3/1204* (2013.01); *G06F 3/128* (2013.01);
(Continued)

(58) Field of Classification Search
CPC .............................. H04W 4/008; H04W 4/023
See application file for complete search history.

(56) References Cited

U.S. PATENT DOCUMENTS 6,297,805 B1   10/2001   Adler et al.
6,665,717 B1   12/2003   Aizono et al.
(Continued)

FOREIGN PATENT DOCUMENTS

EP   0 798 651 A2   10/1997
EP   0 899 650 A2   3/1999
(Continued)

OTHER PUBLICATIONS

Australian Examination Report dated Feb. 12, 2015 issued in counterpart application No. 2010287253.
(Continued)

*Primary Examiner* — Tuan H Nguyen
(74) *Attorney, Agent, or Firm* — Jefferson IP Law, LLP

(57) ABSTRACT

A device for performing a cooperative function with another device is provided. The device includes a communication unit; and a controller that determines whether the other device is in a surrounding area of the device based a signal received through the communication unit, selects one cooperative function from among a plurality of cooperative functions according to a relative position of the device with respect to the other device and performs the selected cooperative function with the other device.

11 Claims, 15 Drawing Sheets

Related U.S. Application Data continuation of application No. 12/862,301, filed on Aug. 24, 2010, now Pat. No. 8,995,913.

(51) Int. Cl.

| | | |
|---|---|---|
| *H04W 4/00* | (2009.01) | |
| *G06F 3/12* | (2006.01) | |
| *G06K 15/00* | (2006.01) | |
| *H04W 4/04* | (2009.01) | |

(52) U.S. Cl.
CPC .......... *G06F 3/1236* (2013.01); *G06F 3/1292* (2013.01); *G06F 13/385* (2013.01); *G06K 15/007* (2013.01); *H04W 4/008* (2013.01); *H04W 4/04* (2013.01)

(56) References Cited

U.S. PATENT DOCUMENTS

| | | | |
|---|---|---|---|
| 6,985,589 | B2 | 1/2006 | Morley et al. |
| 7,228,137 | B2 | 6/2007 | Chinomi et al. |
| 8,086,214 | B2 | 12/2011 | Naruse |
| 8,154,472 | B2 | 4/2012 | Yamaguchi et al. |
| 2002/0196125 | A1* | 12/2002 | Yu .......................... G06Q 30/02 340/7.48 |
| 2003/0206635 | A1 | 11/2003 | Morley et al. |
| 2005/0090294 | A1 | 4/2005 | Narasimhan |
| 2005/0135619 | A1 | 6/2005 | Morley et al. |
| 2005/0276575 | A1 | 12/2005 | Murayama et al. |
| 2007/0211762 | A1 | 9/2007 | Song et al. |
| 2007/0273609 | A1 | 11/2007 | Yamaguchi et al. |
| 2008/0005272 | A1 | 1/2008 | Kim et al. |
| 2008/0005767 | A1 | 1/2008 | Seo |
| 2008/0084577 | A1 | 4/2008 | Mihira |
| 2008/0209011 | A1 | 8/2008 | Stremel et al. |
| 2008/0320094 | A1 | 12/2008 | Tu et al. |
| 2009/0193474 | A1 | 7/2009 | Stein |
| 2009/0253372 | A1 | 10/2009 | Naruse |
| 2009/0254602 | A1 | 10/2009 | Yoshida |
| 2009/0254980 | A1 | 10/2009 | Kanaparti |
| 2010/0250794 | A1* | 9/2010 | Hanks ................... G06F 1/3265 710/33 |
| 2012/0127168 | A1 | 5/2012 | Yamaguchi et al. |
| 2013/0184002 | A1 | 7/2013 | Moshfeghi |

FOREIGN PATENT DOCUMENTS

| | | |
|---|---|---|
| EP | 1 109 367 A2 | 6/2001 |
| JP | 11-143606 A | 5/1999 |
| JP | 2001-167019 A | 6/2001 |
| JP | 2005-354312 A | 12/2005 |
| JP | 2006-092332 A | 4/2006 |
| JP | 2007-259288 A | 10/2007 |
| JP | 2008-003574 A | 1/2008 |
| JP | 2009-253476 A | 10/2009 |
| JP | 2010-011054 A | 1/2010 |
| KR | 10-2008-0005840 A | 1/2008 |
| KR | 10-2009-0011298 A | 2/2009 |
| RU | 2 257 015 C2 | 7/2005 |
| WO | 2005/004415 A1 | 1/2005 |
| WO | 2008/085844 A1 | 7/2008 |
| WO | 2010/151284 A1 | 12/2010 |

OTHER PUBLICATIONS

European Search Report dated Oct. 21, 2014 issued in counterpart application No. 10173898.7-1954.
Australian Examination Report dated Oct. 24, 2014 issued in counterpart application No. 2010287253.
Chinese Office Action dated Dec. 1, 2014 issued in counterpart application No. 201010260479.4.
Russian Office Action dated Dec. 4, 2014 issued in counterpart application No. 2012111311/08.
Japanese Office Action dated Jun. 12, 2014 issued in counterpart Appln. No. 2010-187070.
Chinese Office Action dated Jul. 3, 2014 issued in counterpart Appln. No. 201010260479.4.
Russian Office Action dated Apr. 10, 2015 issued in counterpart application No. 2012111311/08.
Chinese Office Action dated May 6, 2015 issued in counterpart Appln. No. 201010260479.4.
Notice of Acceptance Office Action dated Jul. 10, 2015 issued in counterpart application No. 2010287253, 3 pages.
Korean Office Action dated Sep. 16, 2015 issued in counterpart Appln. No. 10-2009-0078349, 7 pages.

* cited by examiner

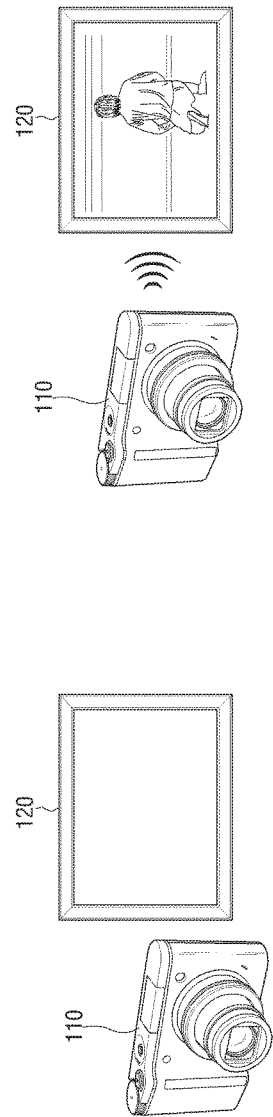

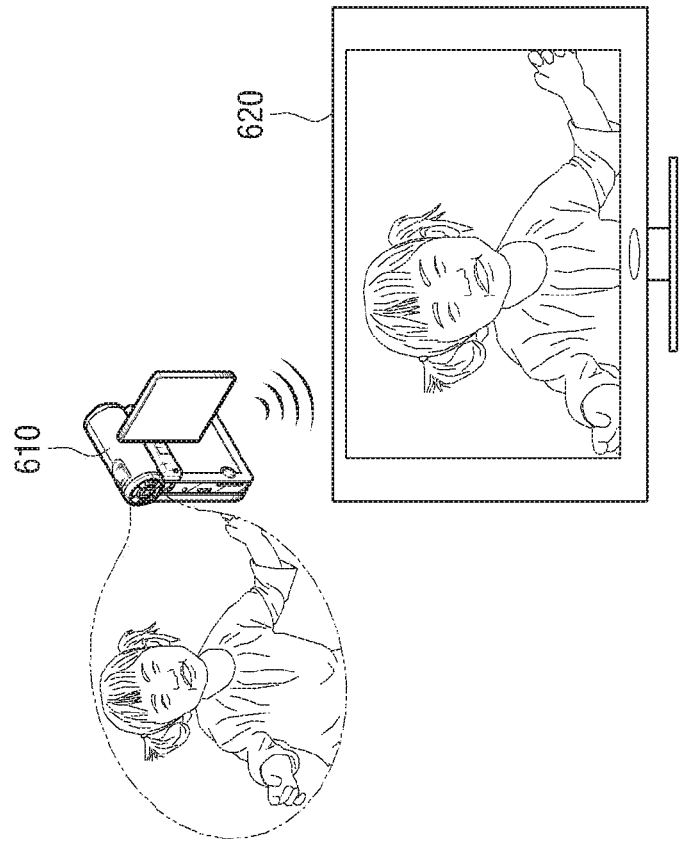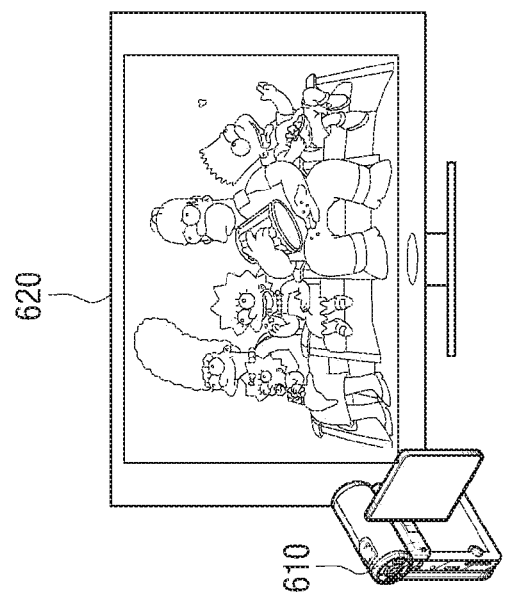

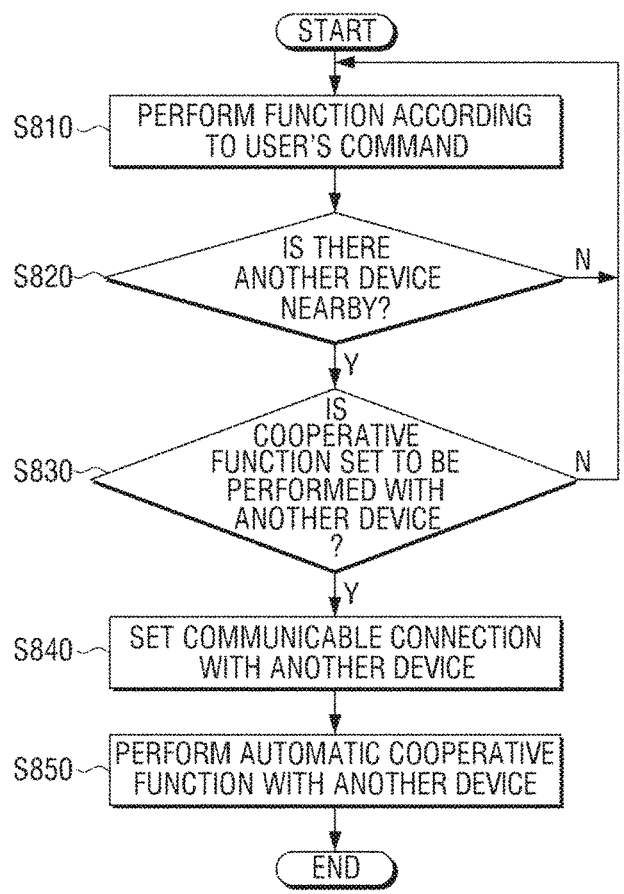

METHOD FOR PERFORMING COOPERATIVE FUNCTION AUTOMATICALLY AND DEVICE USING THE SAME

CROSS-REFERENCE TO RELATED APPLICATION(S)

This application is a continuation application of prior application Ser. No. 14/638,757, filed on Mar. 4, 2015, which issued as U.S. Pat. No. 9,326,095 on Apr. 26, 2016, which is a continuation of U.S. application Ser. No. 12/862,301, filed on Aug. 24, 2010, which issued as U.S. Pat. No. 8,995,913 on Mar. 31, 2015, and claims priority under 35 U.S.C. §119(a) to Korean Patent Application No. 10-2009-0078349, filed Aug. 24, 2009, in the Korean Intellectual Property Office, the entire content of each of which is incorporated herein by reference.

BACKGROUND OF THE INVENTION

1. Field of the Invention

The present invention relates generally to a method for performing a cooperative function and a device using the same, and more particularly, to a method for allowing a plurality of devices to perform a single cooperative function together, and a device using the same.

2. Description of the Related Art

With the advent of various digital devices, the number of digital devices that a single user possesses has increased significantly.

These various digital devices have provided increased convenience, and continue to become more sophisticated by incorporating multi-functions.

The user, however, still pursues digital devices having more advanced and sophisticated functions.

However, a digital device is limited in the number of functions it can perform on its own. Therefore, a method for converging and combining each device owned by the user is required to create a new function which can be performed by a plurality of digital devices.

SUMMARY OF THE INVENTION

The present invention has been made to address at least the above problems and/or disadvantages and to provide at least the advantages described below. Accordingly, an aspect of the present invention provides a method for performing a cooperative function if it is determined that there are other devices in the surrounding area, and a device using the same.

According to an aspect of the present invention, a device for performing a cooperative function with another device is provided. The device includes a communication unit; and a controller that determines whether the other device is in a surrounding area of the device based a signal received through the communication unit, selects one cooperative function from among a plurality of cooperative functions according to a relative position of the device with respect to the other device and performs the selected cooperative function with the other device.

BRIEF DESCRIPTION OF THE DRAWINGS

The above and other aspects, features and advantages of the present invention will be more apparent from the following detailed description when taken in conjunction with the accompanying drawings, in which:

FIGS. 1A to 7B are diagrams illustrating a concept of performing a cooperative function automatically by devices in adjacent areas, according to embodiments of the present invention;

FIG. 8 is a flowchart illustrating a method for performing a cooperative function automatically among devices in adjacent areas, according to an embodiment of the present invention;

DETAILED DESCRIPTION OF EMBODIMENTS OF THE PRESENT INVENTION

Figure 2A:
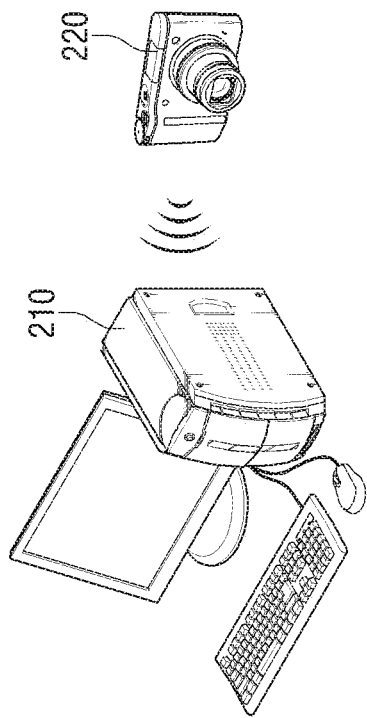

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

FIGS. 1A and 1B are diagrams illustrating a method for performing a cooperative function automatically according to a first embodiment of the present invention. FIG. 1A illustrates that a digital camera 110 is adjacent to an electronic frame 120 (within a predetermined distance).

If the digital camera 110 is adjacent to the electronic frame 120 as illustrated in FIG. 1A, a cooperative function is automatically performed by the digital camera 110 and the electronic frame 120 as illustrated in FIG. 1B.

FIG. 1B illustrates that the digital camera 110 transmits stored photos to the electronic frame 120, and the electronic frame 120 reproduces the photos received from the digital camera 110 as a slideshow.

In order to perform the above cooperative function, the digital camera 110 is preset to transmit stored photos to the electronic frame 120 if the digital camera 110 is adjacent to the electronic frame 120.

In addition, in order to perform the above cooperative function, the electronic frame 120 is preset to reproduce the photos received from the digital camera 110 as a slideshow if the electronic frame 120 is adjacent to the digital camera 110.

Once the cooperative function starts between the digital camera 110 and the electronic frame 120, the cooperative function continues even if the distance between the two becomes wide.

Figure 2B:
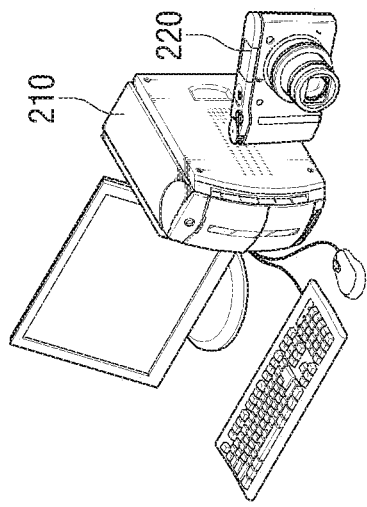

FIGS. 2A and 2B are diagrams illustrating a method for performing a cooperative function automatically, according to a second embodiment of the present invention. FIG. 2A illustrates that a digital camera 220 is adjacent to a Personal Computer (PC) 210.

If the digital camera 220 is adjacent to the PC 210 as illustrated in FIG. 2A, a cooperative function is automatically performed by the digital camera 220 and the PC 210, as illustrated in FIG. 2B.

FIG. 2B illustrates that the digital camera 220 transmits additionally stored photos to the PC 210, and the PC 210 backs-up the photos received from the digital camera 220 in a designated folder of the Hard Disk Drive (HDD).

In order to perform the above cooperative function, the digital camera 220 is preset to transmit additionally stored photos to the PC 210 if the digital camera 220 is adjacent to the PC 210.

In addition, in order to perform the above cooperative function, the PC 210 is preset to back-up the photos received from the digital camera 220 in a designated folder of the HDD if the PC 210 is adjacent to the digital camera 220.

Once the cooperative function starts between the PC 210 and the digital camera 220, the cooperative function continues even if the distance between the two becomes wide.

Figure 3B:
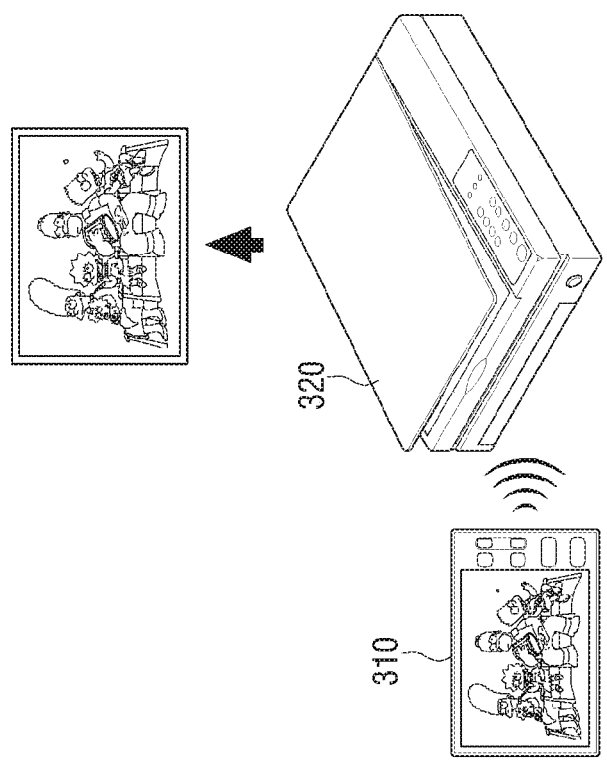
Figure 3A:
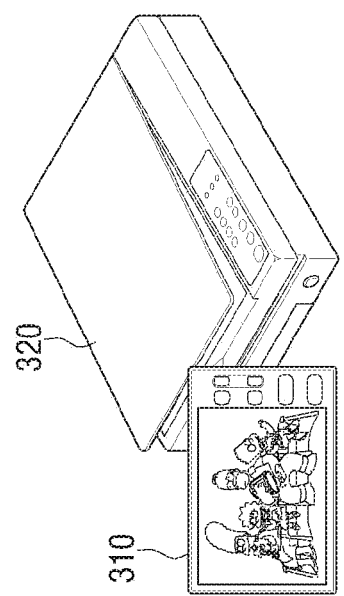

FIGS. 3A and 3B are diagrams illustrating a method for performing a cooperative function automatically, according to a third embodiment of the present invention. FIG. 3A illustrates that a digital camera 310, which is reproducing photos, is adjacent to a printer 320.

If the digital camera 310 is adjacent to the printer 320 as illustrated in FIG. 3A, a cooperative function is automatically performed by the digital camera 310 and the printer 320, as illustrated in FIG. 3B.

FIG. 3B illustrates that the digital camera 310 transmits photos which are being reproduced to the printer 320, and the printer 320 prints the photos received from the digital camera 310.

In order to perform the above cooperative function, the digital camera 310 is preset to transmit photos that are currently being reproduced to the printer 320 if the digital camera 310 is adjacent to the printer 320.

In addition, in order to perform the above cooperative function, the printer 320 is preset to print the photos received from the digital camera 310 if the printer 320 is adjacent to the digital camera 310.

If an MP3 player, which is reproducing music, is adjacent to the printer 320, the MP3 player transmits information regarding the current music to the printer 320 and the printer 320 may download the lyrics or music book of the current music through the Internet and print them.

Figure 4B:
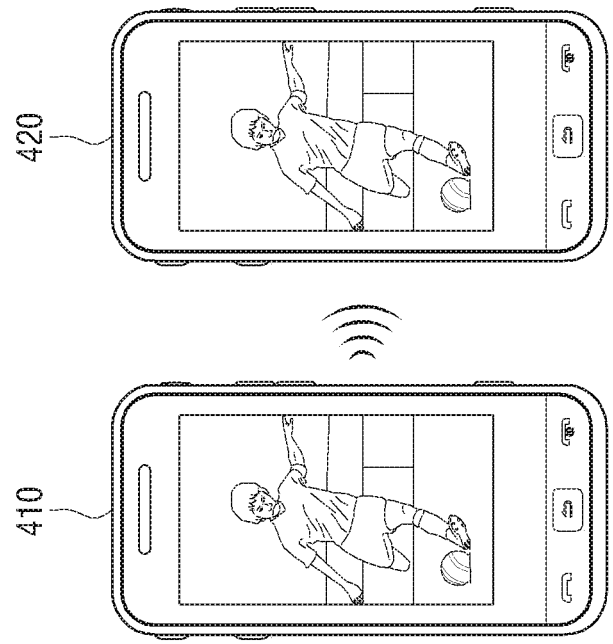
Figure 4A:
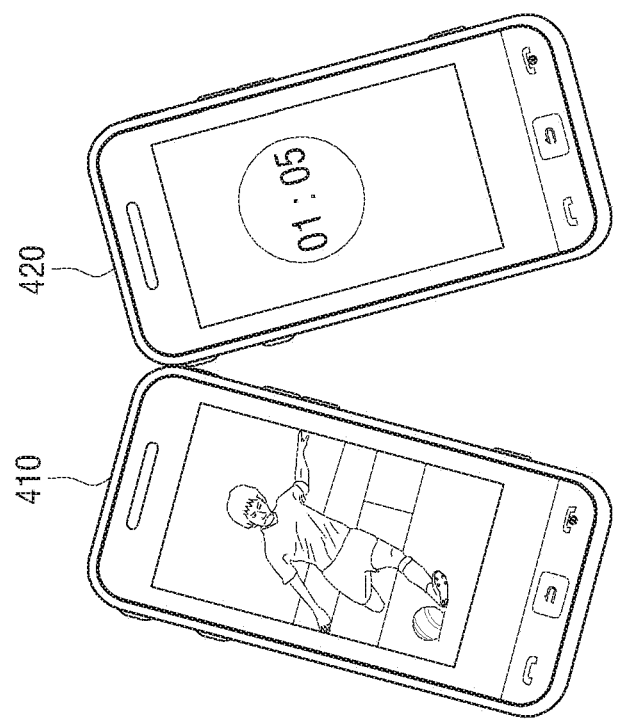

FIGS. 4A and 4B are diagrams illustrating a method for performing a cooperative function automatically, according to a fourth embodiment of the present invention. FIG. 4A illustrates that a mobile phone-A 410, which is reproducing photos, is adjacent to a mobile phone-B 420, which is in a standby mode.

If the mobile phone-A 410 is adjacent to the mobile phone-B 420 as illustrated in FIG. 4A, a cooperative function is automatically performed by the mobile phone-A 410 and the mobile phone-B 420, as illustrated in FIG. 4B.

FIG. 4B illustrates that the mobile phone-A 410 transmits photos, which are currently being reproduced, to the mobile phone-B 420, and the mobile phone-B 420 changes its mode from a standby mode to a photo play mode, and displays the photos received from the mobile phone 410 on a screen.

In order to perform the above cooperative function, the mobile phone-A 410 is preset to transmit photos, which are currently being reproduced to the mobile phone-B 420, if the mobile phone-A 410 is adjacent to the mobile phone-B 420.

In addition, in order to perform the above cooperative function, the mobile phone 420 is preset to display the photos received from the mobile phone-A 410 if the mobile phone 420-B is adjacent to the mobile phone-A 410.

Once the cooperative function starts between the mobile phone-A 410 and the mobile phone-B 420, the cooperative function continues even if the distance between the two becomes wide.

Figure 5B:
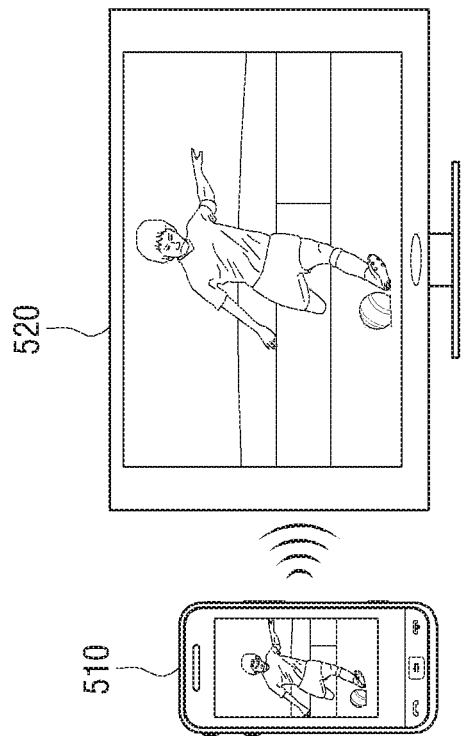
Figure 5A:
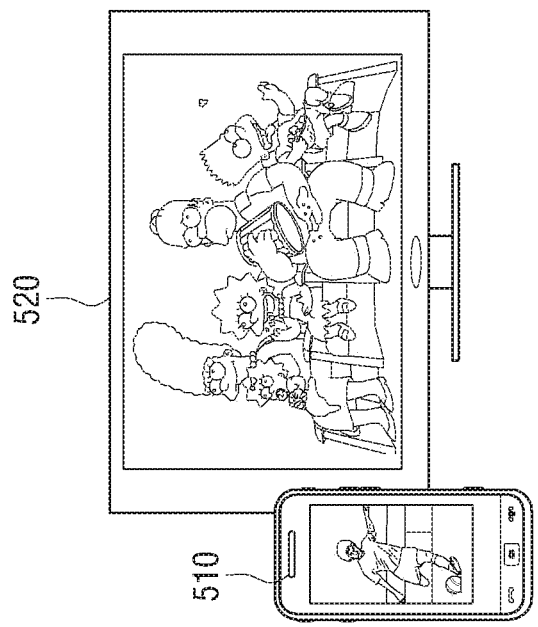

FIGS. 5A and 5B are diagrams illustrating a method for performing a cooperative function automatically, according to a fifth embodiment of the present invention. FIG. 5A illustrates that a mobile phone-A 510, which is reproducing photos, is adjacent to a television (TV) 520, which is reproducing broadcast.

If the mobile phone 510 is adjacent to the TV 520 as illustrated in FIG. 5A, a cooperative function is automatically performed by the mobile phone 510 and the TV 520, as illustrated in FIG. 5B.

FIG. 5B illustrates that the mobile phone 510 transmits photos, which are currently being reproduced, to the TV 520, and the TV 520 stops reproducing broadcast and reproduces the photos received from the mobile phone 510.

In order to perform the above cooperative function, the mobile phone 510 is preset to transmit photos, which are currently being reproduced, to the TV 520 if the mobile phone 510 is adjacent to the TV 520.

In addition, in order to perform the above cooperative function, the TV 520 is preset to reproduce the photos received from the mobile phone 510 if the TV 520 is adjacent to the mobile phone 510.

Once the cooperative function starts between the mobile phone 510 and the TV 520, the cooperative function continues even if the distance between the two becomes wide.

FIGS. 6A and 6B are diagrams illustrating a method for performing a cooperative function automatically, according to a sixth embodiment of the present invention. FIG. 6A illustrates that a digital camcorder 610 is adjacent to a TV 620, which is reproducing broadcast.

If the digital camcorder 610 is adjacent to the TV 620 as illustrated in FIG. 6A, a cooperative function is automatically performed by the digital camcorder 610 and the TV 620, as illustrated in FIG. 6B.

FIG. 6B illustrates that the digital camcorder 610 transmits images currently being photographed to the TV 620, and the TV 620 stops reproducing broadcast and reproduces the images received from the digital camcorder 610.

In order to perform the above cooperative function, the digital camcorder 610 is preset to transmit images, which are currently being photographed, to the TV 620 if the digital camcorder 610 is adjacent to the TV 620.

In addition, in order to perform the above cooperative function, the TV 620 is preset to reproduce the images received from digital camcorder 610 if the TV 620 is adjacent to the digital camcorder 610.

Once the cooperative function starts between the digital camcorder 610 and the TV 620, the cooperative function continues even if the distance between the two becomes wide.

Figure 7A:
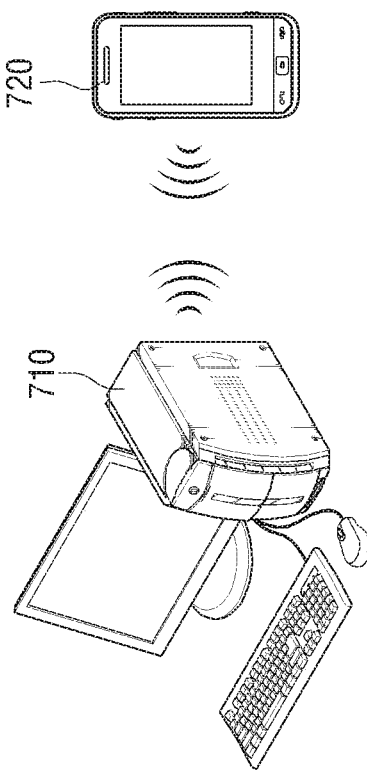
Figure 7B:
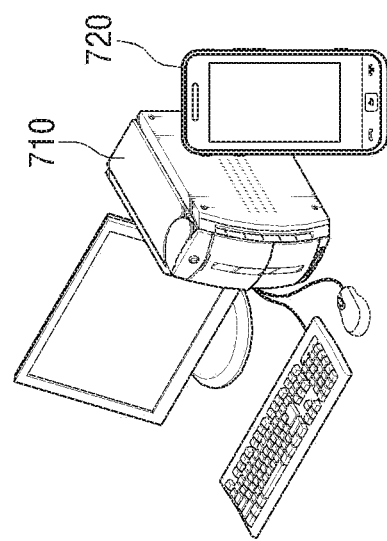

FIGS. 7A and 7B are diagrams illustrating a method for performing a cooperative function automatically, according to a seventh embodiment of the present invention. FIG. 7A illustrates that a mobile phone 720 is adjacent to a PC 710.

If the mobile phone 720 is adjacent to the PC 710 as illustrated in FIG. 7A, a cooperative function is automatically performed by the mobile phone 720 and the PC 710 as illustrated in FIG. 7B.

FIG. 7B illustrates that the mobile phone 720 transmits stored schedule information to the PC 710, and the PC 710 backs-up the schedule information received from the mobile phone 720 in a designated folder.

In order to perform the above cooperative function, the mobile phone 720 is preset to transmit stored schedule information to the PC 710 if the mobile phone 720 is adjacent to the PC 710.

In addition, in order to perform the above cooperative function, the PC 710 is preset to back-up the schedule information received from the mobile phone 720 in a designated folder if the PC 710 is adjacent to the mobile phone 720.

Once the cooperative function starts between the mobile phone 720 and the PC 710, the cooperative function continues even if the distance between the two becomes wide.

FIG. 8 is a flowchart illustrating a method for performing a cooperative function automatically among devices in adjacent areas, according to an embodiment of the present invention.

As illustrated in FIG. 8, a device performs a function according to a user's command in step S810, and determines whether there is another device in surrounding areas in step S820.

If it is determined that there is another device nearby in step S820, the device determines whether an automatic cooperative function is set between the device and the other device in step S830.

If it is determined that an automatic cooperative function is set in step S830, the device sets a communicable connection with the other device in step S840.

Subsequently, the device performs the cooperative function with the other device automatically in step S850.

Figure 9B:
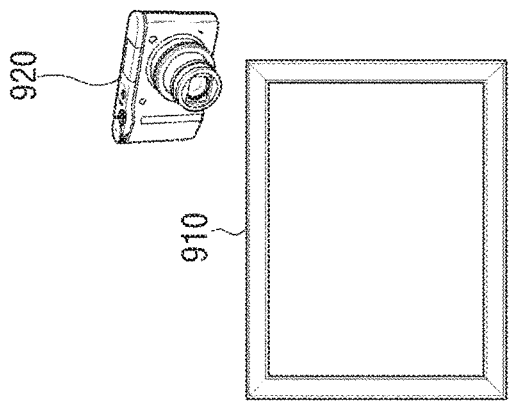
FIGS. 9A to 10B are diagrams illustrating a concept of performing a cooperative function automatically which is set in advance considering locations of devices in adjacent areas, according to an embodiment of the present invention.
Figure 9A:
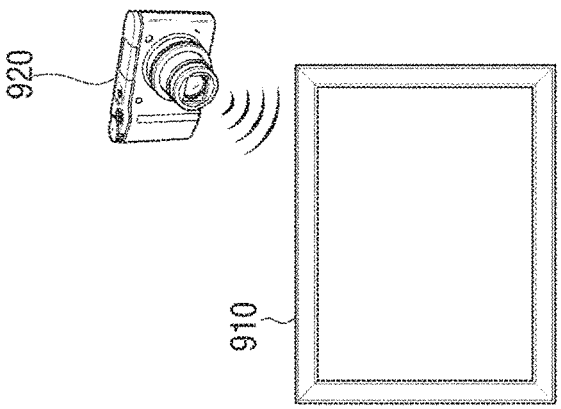

FIGS. 9A and 9B and FIGS. 10A and 10B are diagrams illustrating a method for performing a cooperative function automatically, according to an eighth embodiment of the present invention. FIG. 9A illustrates that a digital camera 920 is adjacent to the 'back' of an electronic frame 910.

If the digital camera 920 is adjacent to the back of the electronic frame 910 as illustrated in FIG. 9A, a cooperative function is automatically performed by the digital camera 920 and the electronic frame 910 as illustrated in FIG. 9B.

FIG. 9B illustrates that the digital camera 920 transmits stored photos to the electronic frame 910, and the electronic frame 910 backs-up the photos received from the digital camera 920 in its own storage medium.

In order to perform the above cooperative function, the digital camera 920 is preset to transmit stored photos to the electronic frame 910 if the digital camera 920 is adjacent to the back of the electronic frame 910.

In addition, in order to perform the above cooperative function, the electronic frame 910 is preset to back-up the photos received from the digital camera 920 if the back of electronic frame 910 is adjacent to the digital camera 920.

Once the cooperative function starts between the digital camera 920 and the electronic frame 910, the cooperative function continues even if the distance between the two becomes wide.

Figure 10A:
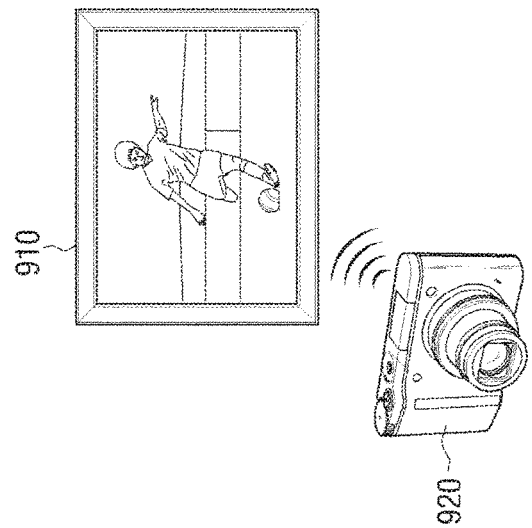

FIG. 10A illustrates that the digital camera 920 is adjacent to the 'front' of the electronic frame 910.

Figure 10B:
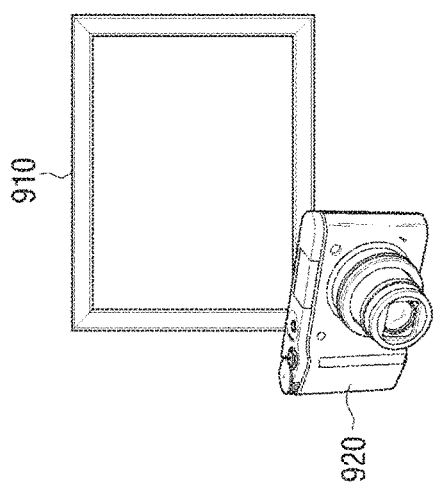

If the digital camera 920 is adjacent to the front of the electronic frame 910 as illustrated in FIG. 10A, a cooperative function is automatically performed by the digital camera 920 and the electronic frame 910 as illustrated in FIG. 10B.

FIG. 10B illustrates that the digital camera 920 transmits stored photos to the electronic frame 910, and the electronic frame 910 reproduces the photos received from the digital camera 920 as a slideshow.

In order to perform the above cooperative function, the digital camera 920 is preset to transmit stored photos to the electronic frame 910 if the digital camera 920 is adjacent to the front of the electronic frame 910.

In addition, in order to perform the above cooperative function, the electronic frame 910 is preset to reproduce the photos received from the digital camera 920 as a slideshow if the front of electronic frame 910 is adjacent to the digital camera 920.

Once the cooperative function starts between the digital camera 920 and the electronic frame 910, the cooperative function continues even if the distance between the two becomes wide.

Figure 11:
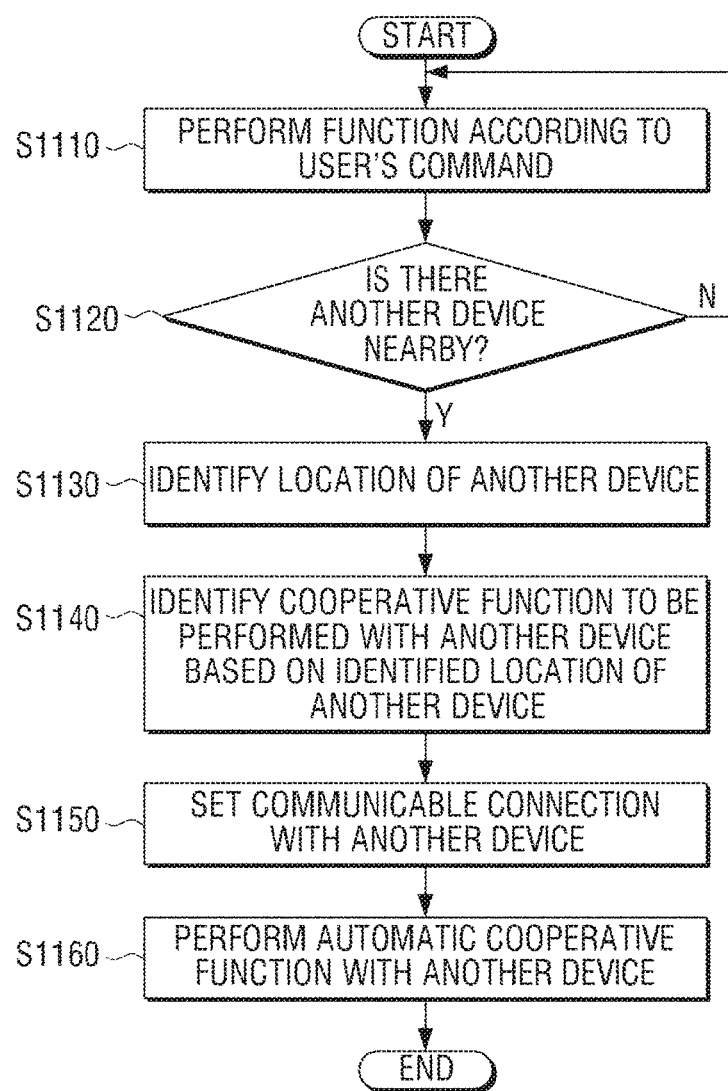
FIG. 11 is a flowchart illustrating a method for performing different cooperative functions automatically considering locations of devices in adjacent areas, according to an embodiment of the present invention.

FIG. 11 is a flowchart illustrating a method for performing different cooperative functions automatically considering locations of devices in adjacent areas, according to an embodiment of the present invention.

As illustrated in FIG. 11, a device performs a function according to a user's command in step S1110 and determines whether there is another device in surrounding areas in step S1120.

If it is determined that there is another device nearby in step S1120, the device identifies the location of the other device in step S1130.

Subsequently, the device identifies an automatic cooperative function that should be performed together with the other device based on the location of the other device in step S1140.

The device sets a communicable connection with the other device in step S1150. Subsequently, the device performs the cooperative function with the other device automatically in step S1160.

FIGS. 12A and 12B, FIGS. 13A and 13B, and FIGS. 14A and 14B are diagrams illustrating a method for performing a cooperative function automatically, according to a ninth embodiment of the present invention.

Figure 12A:
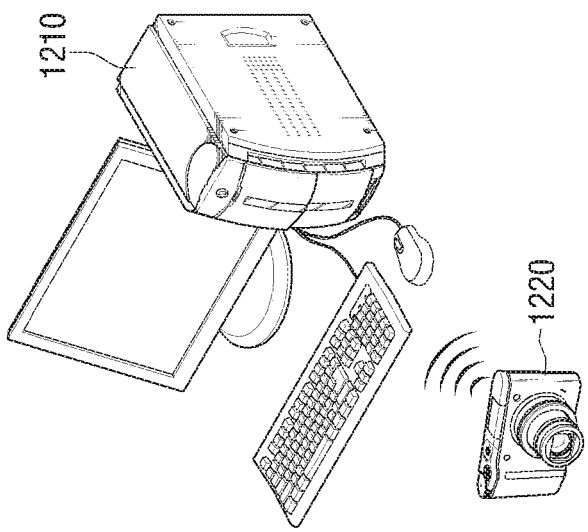
FIGS. 12A to 14B are diagrams illustrating a method for performing different cooperative functions automatically according to locations of devices in adjacent areas, according to an embodiment of the present invention.
Figure 12B:
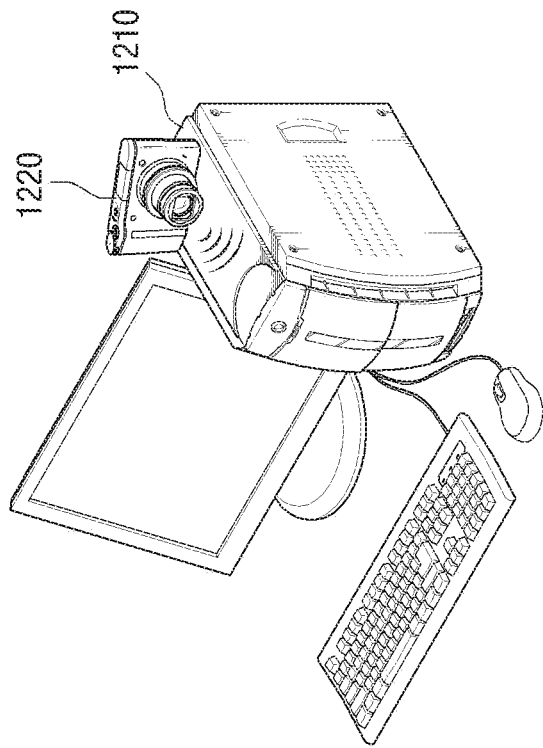

FIG. 12A illustrates that a digital camera 1220 is located on the main body of a PC 1210, and FIG. 12B illustrates that the digital camera 1220 is located in front of the main body of the 1210.

As illustrated in FIG. 12A, if the digital camera 1220 is located on the main body of the PC 1210, the digital camera 1220 may transmit stored photos to the PC 1210 and the PC 1210 may back-up the photos received from the digital camera 1220 in its own storage medium as a cooperative function is automatically performed by the digital camera 1220 and the PC 1210.

As illustrated in FIG. 12B, if the digital camera 1220 is located in front of the main body of the PC 1210, the digital camera 1220 may transmit stored photos to the PC 1210 and the PC 1210 may reproduce the photos received from the digital camera 1220 as a slideshow as a cooperative function is automatically performed by the digital camera 1220 and the PC 1210.

Figure 13A:
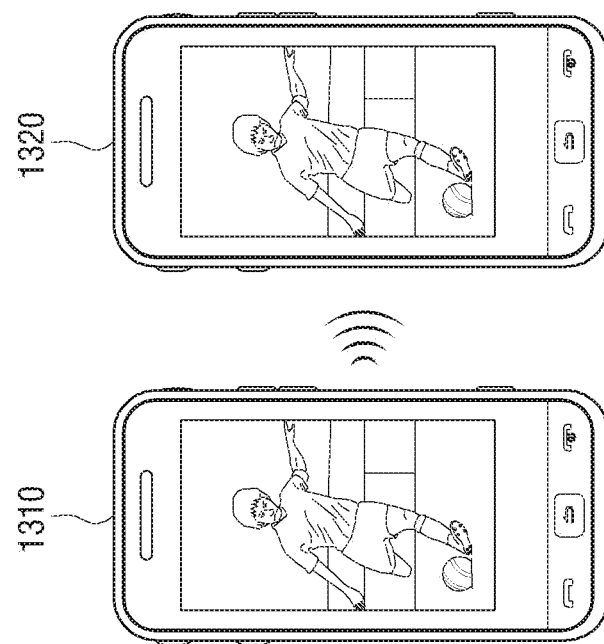

As illustrated in FIG. 13A, if the liquid crystal of a mobile phone-A 1310 and the liquid crystal of a mobile phone-B 1320 are placed side by side facing an upper or lower direction, the address book stored in the mobile phone-A 1310 may be synchronized with the address book stored in the mobile phone-B 1320 as a cooperative function is automatically performed by the mobile phone-A 1310 and the mobile phone-B 1320.

Figure 13B:
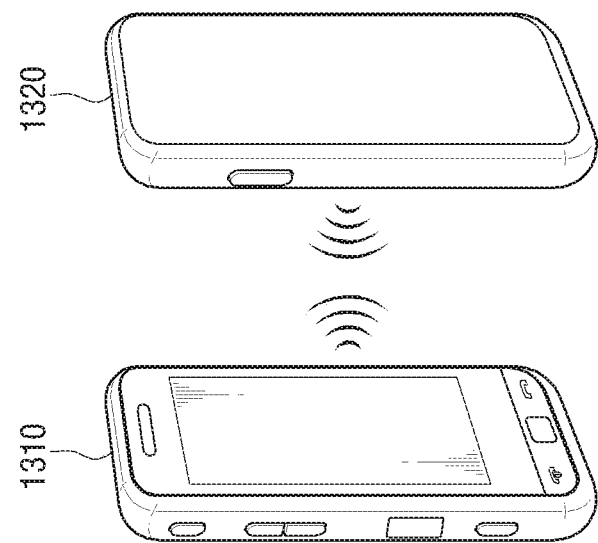

As illustrated in FIG. 13B, if the mobile phone-A 1310 and the mobile phone-B 1320 face each other, the photos stored in the mobile phone-A 1310 may be synchronized with the photos stored in the mobile phone-B 1320 as a cooperative function is automatically performed by the mobile phone-A 1310 and the mobile phone-B 1320.

Figure 14B:
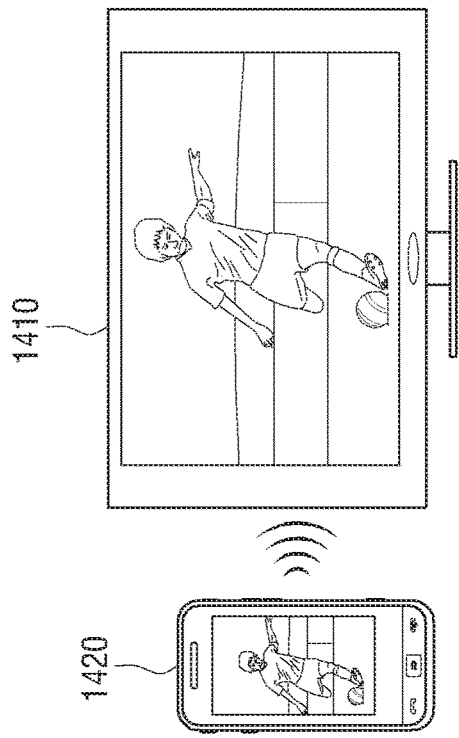
Figure 14A:
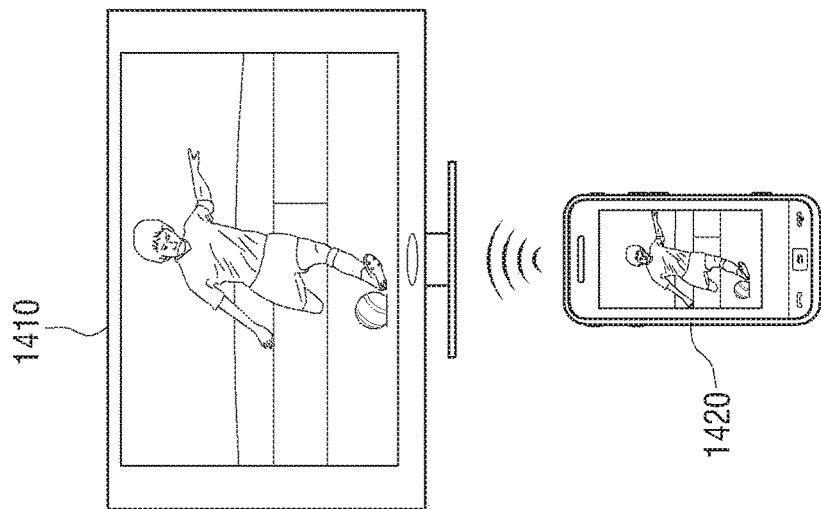

As illustrated in FIG. 14A, if a mobile phone 1420 is located in front of a TV 1410, the mobile phone 1420 may transmit stored photos to the TV 1410, and the TV 1410 may reproduce the photos received from the mobile phone 1420 as a slide show as a cooperative function is automatically performed by the mobile phone 1420 and the TV 1410.

In addition, as illustrated in FIG. 14B, if the mobile phone 1420 is located next to the TV 1410, the contents stored in the mobile phone 1420 may be synchronized with the contents stored in the hard-disk of the TV 1410 or the contents stored in the USB connected to the TV.

In the above embodiments, a cooperative function is automatically performed when two devices become close to each other, but this is only an example. A cooperative function may also be automatically performed when two devices are in contact with each other.

In this case, the type of cooperative function to be performed may be determined depending on which part of a device is contacted by another device. For example, if the device is in contact with the "front" of another device, "a first" cooperative function may be performed, and if the device is in contact with the "back" of another device, "a second" cooperative function may be performed.

To sense which part of the device in contact with another device, sensors should be formed on the surface of the other device.

In addition, the type of cooperative function to be performed may be determined depending on which part of a device contacts which part of another device. For example, if the "front" of the device contacts the "front" of another device, "the first" cooperative function may be performed, and if the "back" of the device contacts the "back" of another device, "the second" cooperative function may be performed.

The type of cooperative function performed by devices may be determined by a user. In addition, the type of cooperative function that is already set may be changed by a user.

A cooperative function may be automatically set according to the properties of a device. For example, since the properties of a camera include taking pictures and the properties of a printer includes printing, a cooperative function may be automatically set as the camera taking pictures and the printer printing the photographed pictures.

The devices mentioned in the above embodiments are only examples. The technical feature of the present invention may be applied to other devices.

Figure 15:
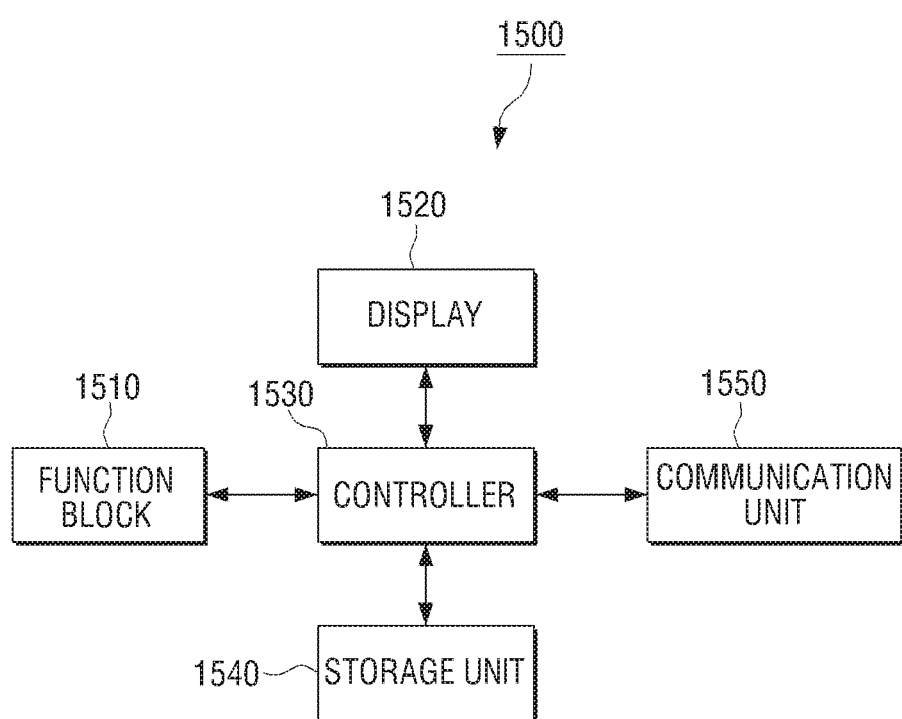
FIG. 15 is a block diagram of a device, according to an embodiment of the present invention.

FIG. 15 is a block diagram of a device to which the present invention is applicable. The device includes a function block 1510, a display 1520, a controller 1530, a storage unit 1540 and a communication unit 1550.

The function block 1510 performs an original function of the device. If the device is a mobile phone, the function block performs telephone communication and SMS, and if the device is a TV, the function block 1510 performs broadcast reception and reproduction.

The display 1520 displays the performance result of the function block 1510 and the GUI.

The storage unit 1540 is a storage medium to store programs necessary to perform the function of the function block 1510 and to provide the GUI, contents, and other data.

The communication unit 1550 senses whether another device approaches a device in surrounding areas, and sets a communicable connection between the device and a sensed device.

In addition, the communication unit 1550 senses the location of another device in surrounding areas. For example, the communication unit 1550 senses from which sides among front, back, left and right another device approaches. To do so, the communication unit 1550 may use a plurality of directional antennas and a plurality of directional sensors.

Meanwhile, the communication unit 1550 may have a bi-directional wireless communication module to sense the location of other devices in surrounding areas. In this case, there is no limitation to the method of wireless communication of the bi-directional wireless communication module. Therefore, the wireless communication may be realized as infrared communication, sound wave communication, an RF communication, or wireless network communication.

The controller 1530 controls the device to perform a cooperative function with another device through the process illustrated in FIGS. 8 and 11.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A device for sharing a content with an external device, the device comprising:
    a display;
    a communication unit configured to communicate with the external device in a surrounding area of the device; and
    a controller that is configured to:
        control to display the content on the display,
        determine whether there is the external device capable of communicating with the communication unit,
        determine whether the external device is preset to automatically display the content received from the device, and
        control the communication unit to transmit the content to the external device based on determining that the external device is preset to automatically display the content received from the device.

2. The device of claim 1,
    wherein the external device is preset to automatically display the content received from the device, and
    wherein the external device is in a standby mode before receiving the content from the device.

3. The device of claim 1,
    wherein the external device is preset to automatically stop reproducing a video content and to automatically display the content received from the device, and
    wherein the video content is being reproduced by the external device before displaying the content received by the first device.

4. The device of claim 3, wherein the received content is superimposed on the video content.

5. The device of claim 1, wherein the content comprises at least one of a photo content and a video content.

6. A method for sharing a content between a first device and a second device, the method comprising:
    displaying the content on a display of the first device;
    determining, by the first device, whether there is the second device capable of communicating with the first device;
    determining, by the first device, whether the second device is preset to automatically display the content received from the first device; and transmitting, by the first device, the content to the second device based on determining that the second device is preset to automatically display the content received from the first device.

7. The method of claim 6,
wherein the second device is preset to automatically display the content received from the first device, and
wherein the second device is in a standby mode before receiving the content from the first device.

8. The method of claim 6,
wherein the second device is preset to automatically stop reproducing a video content and to automatically display the content received from the first device, and
wherein the video content is reproduced by the second device before displaying the content received by the first device.

9. The method of claim 8, wherein the received content is superimposed on the video content.

10. The method of claim 6, wherein the content comprises at least one of a photo content and a video content.

11. A machine-readable, non-transitory, tangible storage medium, storing executable instructions thereon, which are configured to cause a processor, in a device with a display, to execute a method for sharing a content with an external device, the method comprising:
displaying the content on the display of the device;
determining, by the device, whether there is the external device capable of communicating with the device;
determining, by the device, whether the external device is preset to automatically display the content received from the device; and
transmitting, by the device, the content to the external device based on determining that the external device is preset to automatically display the content received from the device.

* * * * *